(12) United States Patent
Barkow et al.

(10) Patent No.: US 12,097,769 B2
(45) Date of Patent: Sep. 24, 2024

(54) APPARATUS AND METHOD FOR INFLUENCING ELECTROMAGNETIC FORCES OF AN ELECTRIC TRACTION MOTOR

(71) Applicant: Dr. Ing. h.c. F. Porsche Aktiengesellschaft, Stuttgart (DE)

(72) Inventors: Maximilian Barkow, Stuttgart (DE); Robert Nelles, Stuttgart (DE); Hugo Kock, Stuttgart (DE); Jan Naegelkraemer, Stuttgart (DE)

(73) Assignee: Dr. Ing. h.c. F. Porsche AG, Stuttgart (DE)

(*) Notice: Subject to any disclaimer, the term of this patent is extended or adjusted under 35 U.S.C. 154(b) by 259 days.

(21) Appl. No.: 17/173,235

(22) Filed: Feb. 11, 2021

(65) Prior Publication Data

US 2021/0276430 A1    Sep. 9, 2021

(30) Foreign Application Priority Data

Mar. 3, 2020   (DE) .................... 10 2020 105 630.3

(51) Int. Cl.
*B60L 15/20* (2006.01)

(52) U.S. Cl.
CPC ......... *B60L 15/20* (2013.01); *B60L 2240/421* (2013.01); *B60L 2240/423* (2013.01);
(Continued)

(58) Field of Classification Search
CPC .............. B60L 15/20; B60L 2240/421; B60L 2240/423; B60L 2240/425; B60L 2240/427; B60L 2240/429
See application file for complete search history.

(56) References Cited

U.S. PATENT DOCUMENTS

| | | |
|---|---|---|
| 5,808,437 A | 9/1998 | Schoeb |
| 6,549,871 B1 * | 4/2003 | Mir .............. B62D 5/046 702/145 |

(Continued)

FOREIGN PATENT DOCUMENTS

| | | |
|---|---|---|
| DE | 10 2009 056 784 | 6/2011 |
| DE | 10 2012 107 970 | 2/2013 |

(Continued)

OTHER PUBLICATIONS

Japanese Office Action dated Apr. 5, 2022.
German Search Report of Jul. 30, 2020.
Japanese Office Action dated Feb. 14, 2023.

*Primary Examiner* — James J Lee
*Assistant Examiner* — Wenyuan Yang
(74) *Attorney, Agent, or Firm* — Gerald E. Hespos; Michael J Porco

(57) ABSTRACT

An apparatus and a method for influencing electromagnetic forces of an electric traction motor, a higher-order harmonic (336) being superimposed on an actuating variable ($u_{dq}$) for the electric traction motor in a manner which is dependent on a rotational speed of the electric traction motor, a torque of the electric traction motor, a temperature at the electric traction motor, or a three-phase current or a three-phase voltage of the electric traction motor for the generation of a resulting actuating variable ($u_{abc}$), the electric traction motor being actuated in a manner which is dependent on the resulting actuating variable ($u_{abc}$), and the actuating variable ($u_{dq}$), the harmonic (336) and the resulting actuating variable ($u_{abc}$) characterizing an actuating current or an actuating voltage.

12 Claims, 3 Drawing Sheets

(52) U.S. Cl.
 CPC ............... *B60L 2240/425* (2013.01); *B60L 2240/427* (2013.01); *B60L 2240/429* (2013.01)

(56) References Cited

U.S. PATENT DOCUMENTS

| | | | |
|---|---|---|---|
| 7,151,354 B2 | 12/2006 | Yoshinaga et al. | |
| 9,065,365 B2 | 6/2015 | Omata et al. | |
| 9,985,569 B2 | 5/2018 | Suzuki | |
| 2005/0073280 A1* | 4/2005 | Yoshinaga | H02P 21/00 318/727 |
| 2007/0107973 A1* | 5/2007 | Jiang | B62D 5/046 180/443 |
| 2009/0267555 A1* | 10/2009 | Schulz | H02P 29/50 318/432 |
| 2012/0306421 A1 | 12/2012 | Kessler et al. | |
| 2013/0049653 A1 | 2/2013 | Katou et al. | |
| 2016/0111986 A1 | 4/2016 | Vollmer et al. | |
| 2016/0315577 A1* | 10/2016 | Suzuki | H02P 21/05 |
| 2020/0119678 A1* | 4/2020 | Hoshino | H02P 27/08 |

FOREIGN PATENT DOCUMENTS

| | | |
|---|---|---|
| DE | 10 2013 211 151 | 12/2014 |
| DE | 10 2014 218 10880 | 4/2015 |
| DE | 10 2017 130 635 | 6/2019 |
| EP | 1 292 011 | 3/2003 |
| JP | 2013223352 | 10/2013 |
| JP | 2018125911 | 8/2018 |
| JP | 2020010474 | 1/2020 |
| WO | 96/17180 | 6/1996 |

\* cited by examiner

APPARATUS AND METHOD FOR INFLUENCING ELECTROMAGNETIC FORCES OF AN ELECTRIC TRACTION MOTOR

CROSS REFERENCE TO RELATED APPLICATION

This application claims priority under 35 USC 119 to German Patent Appl. No. 10 2020 105 630.3 filed on Mar. 3, 2020, the entire disclosure of which is incorporated herein by reference.

BACKGROUND

Field of the Invention

The invention relates to an apparatus and a method for influencing electromagnetic forces of an electric traction motor.

Related Art

DE 102014218880 A1 discloses a motor vehicle electric motor with an active damping system, such as a piezoelectric actuator, that generates a reversed polarity correcting signal for attenuating noise emission. The counter signal influences noise emission in real time in such a way that the noise emission is not to be perceivable for the human auditory system in an effort to increase the comfort of the motor vehicle. Extreme peaks that occur as singular events also are to be equalized by this measure. The correction signal is determined by way of "predication" of known control signals and structure reactions.

DE 102009056784 A1 proposes an additional alternating voltage signal that is superimposed on the PWM motor control signal to reduce the operating noise. To this end, the additional signal is determined by way of an algorithm with inclusion of vibration acceleration sensor measurements and acoustic noise sensor measurements.

The method and apparatus disclosed herein represent an improvement.

SUMMARY

A method for influencing electromagnetic forces of an electric traction motor provides that a higher-order harmonic is superimposed on an actuating variable for the electric traction motor in a manner that is dependent on a rotational speed of the electric traction motor, a torque of the electric traction motor, a temperature at the electric traction motor, or a three-phase current or a three-phase voltage of the electric traction motor for the generation of a resulting actuating variable. The electric traction motor is actuated in a manner that is dependent on the resulting actuating variable, and the actuating variable, the harmonic and the resulting actuating variable characterizing an actuating current or an actuating voltage. The d-q currents may be taken into consideration for the three-phase current, the d-q voltages may be taken into consideration for the three-phase voltage. The higher-order harmonic reduces an acoustic or vibro-acoustic noise that emanates from the traction motor. Without superimposition, a resulting radially and/or tangentially directed force at the stator teeth and the rotor is produced by the actuating voltage. This force has various causes that are superimposed to form a resulting force vector. A suitable selection of the amplitude, the phase and the pilot control angle of the harmonic generates additional force vectors that can reduce the resulting force to zero so that the noise of the electric traction motor is influenced and optimized.

The harmonic preferably may have a frequency that is an integral multiple of a frequency of the fundamental oscillation of the actuating variable, in particular, of the actuating current or the actuating voltage. Integral multiples of the fundamental oscillation are particularly suitable for influencing noise.

The harmonic can be determined in a manner that is dependent on at least one characteristic diagram that assigns an amplitude, a phase and/or a pilot control angle to the rotational speed, the torque and/or the temperature for a determination of the harmonic. In one implementation, three characteristic diagrams can be provided respectively for the amplitude, the phase and the pilot control angle, which are in each case three-dimensional and can have the dimensions of rotational speed, torque, temperature. This simplifies the determination of the harmonic.

The harmonic can be determined in a manner that is dependent on a characteristic diagram that assigns an amplitude, a phase and/or a pilot control angle to the three-phase current or the three-phase voltage, the temperature and/or the rotational speed for a determination of the harmonic. The dependence on the d-q currents or voltages is appropriate when the application provides an assignment of the d-q currents or voltages to rotational speed/torque operating points that are changed in the application.

The function can be carried out in one task. However, dividing the function into two tasks can be advantageous because a determination, for example, of the amplitude can take place more slowly and therefore a CPU load can be reduced. The determination of the amplitude, the phase, and/or the pilot control angle for the harmonic may take place in a first task, and the generation of the harmonic may take place in a second task. As a result, work in an application can be divided between the first task and the second task. For example, only the one task or only the other task can be changed in the application.

The first task can be slower than the second task. As a result, computing resources can be saved, since only the absolutely necessary steps for the generation of the harmonic are carried out in the more rapid second task.

A magnitude of the order of the harmonic may be determined in a manner dependent on a number of pole pairs of the traction motor. An oscillation at the same mechanical frequency is to be generated to influence a surface acceleration of a mechanical motor. In electric systems, this means that the magnitude of the order of the harmonic preferably has to be determined in a manner that is dependent on a number of pole pairs of the traction motor. The mechanical order Ord_mech of the harmonic is determined by way of the electric order Ord_el multiplied by the number of pole pairs p: Ord_mech=Ord_el*p. Conversely, it is also possible for the electric order Ord_el to be extrapolated from the mechanical order Ord_mech: Ord_el=Ord_mech/p.

The resulting actuating variable is determined in a manner that is dependent on the torque and the rotational speed. The resulting actuating variable may be determined in a manner that is dependent on the d-q currents and the rotational speed.

The actuating variable may be determined in a manner dependent on at least one input current that is filtered by way of a filter that can be deactivated. The filter may be a band stop filter or notch filter. The filter may be set in a manner that is dependent on the rotational speed, the order or the frequency of the harmonic and/or a PWM basic frequency, or a frequency of the task of the filter call. As a result, the frequency to be suppressed of the filter is adapted in a variable manner to the rotational speed and/or the frequency of the harmonic. The filter also can be switched off to influence effects on the driving properties or the controlling system. For example, d-q currents at the input of a control deviation of a PI controller that determines the actuating variable are filtered in such a way that the harmonics which are superimposed by way of the function are not perceived as a disturbance variable by the PI controller. As a result, a more stable control behavior of the fundamental oscillation is achieved.

The amplitude, the phase, and/or the pilot control angle for the harmonic may be limited by a limiter to improve stability of a controller of the electric traction motor.

Plural harmonics of differing order may be generated and superimposed for generating the resulting actuating variable. This produces a multi-order noise reduction.

The apparatus comprises a controller configured to actuate an electric traction motor in accordance with the method.

Further advantageous embodiments result from the following description and the drawing.

DETAILED DESCRIPTION

Figure 1:
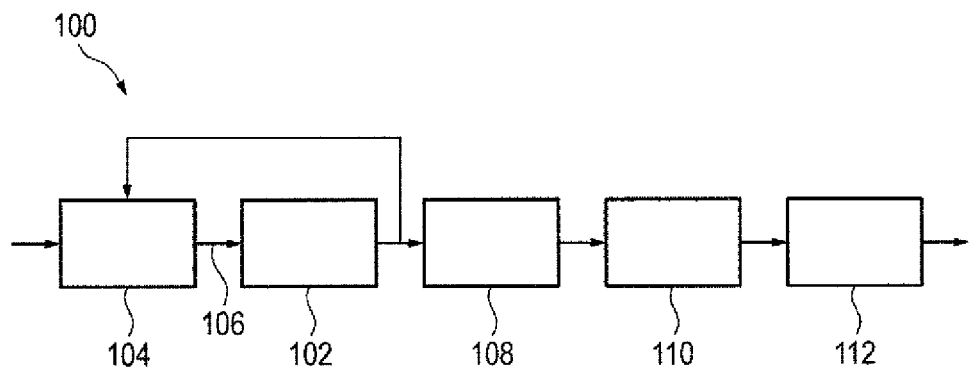
FIG. 1 is a diagrammatic illustration of parts of a traction motor.

FIG. 1 is a diagrammatic illustration of parts of a traction motor 100. The traction motor 100 comprises an electric motor 102 which is controlled, in particular, by three-phase current or three-phase voltage, and which can be controlled by way of a controller 104 which actuates the electric motor 102 with a resulting actuating variable 106.

The resulting actuating variable 106 can be a three-phase voltage, in particular a d-q voltage, or a three-phase current, in particular a d-q three-phase current. A method for determining the resulting actuating variable 106 for influencing electromagnetic forces of the electric traction motor 100 will be described in the following text.

FIG. 1 also shows an effect chain of noise production.

In the example, the electric traction motor 100 comprises an electromagnetic system 108 and a structured dynamic system 110 that influences acoustics 112 of the electric traction motor.

For example, whining noise occurs on account of electromagnetic forces within the electric traction motor 100 with characteristic order numbers.

Figure 2:
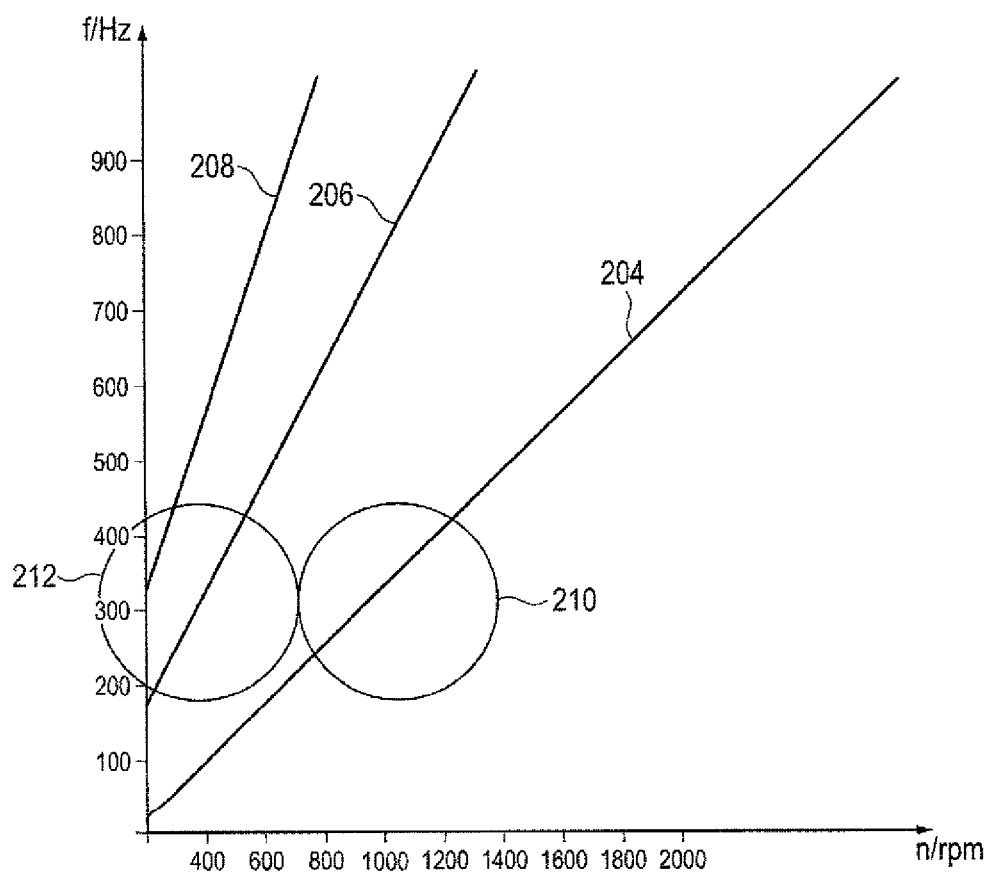
FIG. 2 is a diagrammatic illustration of a Campbell diagram.

FIG. 2 diagrammatically shows a Campbell diagram of a start-up of the traction motor 100 at 250 Nm. The orders that are characteristic for said electric motor can be seen clearly in the Campbell diagram and are shown in FIG. 2 as 24th order 204, 48th order 206 and 72nd order 208.

Natural frequencies of the structure which are excited by way of electromagnetic forces likewise exist. A superelevation of the structure-borne and airborne sound therefore occurs. This is shown by way of example in FIG. 2, for example, in the ranges which are denoted by 210 and 212.

Clearly perceptible noise occurs in the ranges of said natural frequencies of the structure. Depending on the rotational speed of the electric traction motor 100, a different motor order determines the noise level.

The following description uses the example of the 24th order, and can likewise be applied to other orders. Depending on the electric traction motor 100, in particular in the case of permanent magnet synchronous motors, the relevant order numbers differ in a manner which is dependent on the number of pole pairs, holes and strands. It is likewise possible to damp a plurality of orders. In the present example, the electric traction motor 100 has a number of pole pairs of four. An electric frequency is therefore higher by the factor of four than a mechanical frequency. The 24th "mechanical" order 204 which is shown in FIG. 2 therefore corresponds in the electric system to a 6th "electric" order.

For targeted influencing or reduction of acoustically relevant power modes, a compensation for the 24th harmonic is applied a signal for the reduction of the noise vibration harshness, for example in the form of an alternating variable of an (actuating) voltage in addition to the voltage of the controller of the electric motor, that is to say in addition to the basic shaft, by way of targeted imparting of a signal within the controller of the electric traction motor 100. In this way, for example, the current harmonics of the electric traction motor 100 are influenced in such a way that the electromagnetic forces which are produced within the electric traction motor 100 do not excite the structure acoustically or excite it to a significantly weaker extent. As a result of said measure, the structure-borne and airborne noise level can be reduced by over 10 dB over a great rotational speed range.

As a result, structural measures for decoupling support arms are advantageously not necessary. Additional weight for this purpose can be avoided. A data set which is modified with regard to the acoustics 112 of operating points of the electric traction motor 100 is unnecessary.

Figure 3:
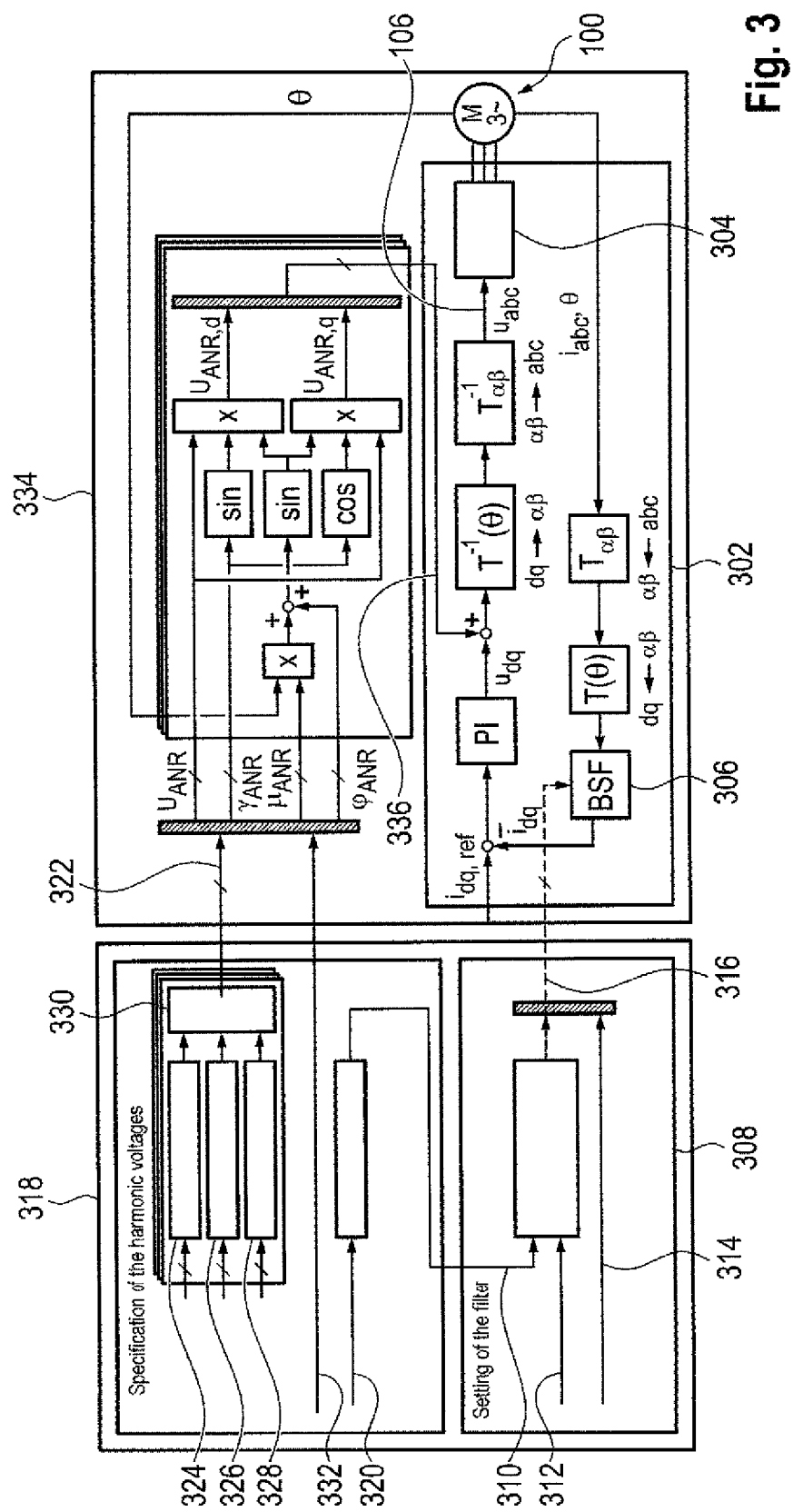
FIG. 3 shows details of a controller for the traction motor.

FIG. 3 diagrammatically shows details of the controller 104. In the example, the controller 104 has a current controller 302 with an output stage 304. The output stage 304 is configured for pulse width modulation (PWM) and as an inverter.

The controller 104 comprises a filter 306, in particular a band stop filter. The filter 306 is configured to provide filtered d-q currents $i_{dq}$ of the electric traction motor 100. The term d-q currents $i_{dq}$ is used to collectively denote the d-current and the q-current. An implementation of the band stop filter is found in the filtering both for the d-current and for the q-current. The filter 306 can be deactivated. When the filter is deactivated, the unfiltered current is switched to its output. The filter coefficients of the band stop filter are determined, for example, in a manner which is dependent on a PWM frequency and a characteristic frequency for the acoustically perceivable vibrations, for example 400 Hz. The band stop filter can likewise be implemented as a notch filter. The filter coefficients are designed in such a way that a frequency range which is as narrow as possible is damped to a pronounced extent.

A transformation of the three-phase current from the electric traction motor 100 for an input of the filter 306 is carried out in a manner which is dependent on a phase position of a rotor of the electric traction motor 100. In the example, the angle θ of the rotor of the electric traction motor 100 which indicates the precise phase position of the rotor is determined to this end. An input current for the filter 306 is determined in the example in a manner which is dependent on the current $i_{abc}$ and is dependent on the angle θ in a transformation $T_{\alpha\beta}$ and a subsequent transformation T(θ).

The controller 104 comprises a coefficient specification device 308 which is configured to specify a filter coefficient for the filter 306 in a manner which is dependent on operating variables, in the example a filter frequency 310, a PWM frequency 312 and an activation 314, that is to say an information item about whether the filter is activated or not.

The controller 104 comprises a signal line 316 and a specification device 318 which is configured for the actuation of the filter 306 via the signal line 316. The specification device 318 is configured to determine the filter coefficients 310 in a manner which is dependent on a rotational speed 320 of the electric traction motor 100, and to specify them to the filter 306. In the example, a frequency selection takes place in a manner which is dependent on the rotational speed.

The specification device 318 is configured to specify parameters 322 in a manner which is dependent on the rotational speed 320, a torque, a temperature, the d-q voltages $u_{dq}$, the d-q currents $i_{dq}$ or the activation 314 of the electric traction motor 100.

In the example, an amplitude 324, a pilot control angle 326 and/or a phase 328 are/is specified as parameter 322 in a manner which is dependent on the rotational speed 320, a torque, a temperature, the d-q currents $i_{dq}$ or the activation 314.

In the example, the amplitude 324, the pilot control angle 326 and the phase 328 are specified by way of a characteristic diagram. It can be provided to limit the parameters 322 by way of a limiter 330 and then to output them.

In the case of a changeover from order-based excitation to frequency-based excitation, the limiter 330 can be configured for a limitation of a change rate of the frequency, for example for a frequency sweep. A limitation of a value range of the frequency can be provided. In particular, a limitation of the minimum and maximum frequency or can be provided. This is advantageous, in order to limit the function to a certain frequency range. Development of resonant oscillations of the current controller 302 can occur for low frequencies. In some circumstances, excessively high frequencies no longer have an effect on the structure-borne sound, since the function is to be deactivated, in order to have no effect on the stability of the control system. A limitation of a change rate both of the amplitude $U_{ANR}$ and of the pilot control angle $\gamma_{ANR}$ can be advantageous, in order to ensure the stability of the control loop. In the case of rapid changes, the filter 306 has to settle. The limitation of the value range of the amplitude $U_{ANR}$ and of the pilot control angle $\gamma_{ANR}$ can be appropriate, in order to limit erroneously set values during the application. An excessively high amplitude $U_{ANR}$ can lead, for example, to pronounced vibrations or to the switch-off of the high voltage system. A limitation of a change rate of the phase 328 can be provided. A sudden change of the phase 328 can lead to an instability. A limitation of the change rate of the phase 328 avoids this.

The specification device 318 is configured for the specification of an order number 332. The order number 332 is also denoted in the following text by $\mu_{ANR}$. The order number 332 determines the frequency of the harmonic 336 substantially by way of the multiplication with the rotor position: $\sin(\mu_{ANR} \times \theta + \varphi_{ANR})$. The temporal phase position $\varphi_{ANR}$ of the harmonic oscillation is taken into consideration independently of this by way of the addition of $\varphi_{ANR}$ to the angle.

The controller 104 comprises an influencing device 334 which is configured to determine a harmonic 336 in a manner which is dependent on the parameters 322. In the example, the harmonic 336 is defined by way of an amplitude $U_{ANR}$ and a pilot control angle $\gamma_{ANR}$ for a higher harmonic alternating variable.

The influencing device 334 is configured in the example to determine the harmonic 336 in the form of the d-q voltages. In the example, a d-actuating voltage $U_{ANR}$, d and a q-actuating voltage $U_{ANR}$, q are determined in a manner which is dependent on a product of the order number $\mu_{ANR}$ with the angle θ of the rotor of the electric traction motor 100, which angle specifies the precise phase position of the rotor. More precisely, a sum of said product with the temporal phase position $\varphi_{ANR}$ is used to this end.

In the example, the angle θ, that is to say the rotor position angle, is multiplied beforehand by the specified order, for example 6. To eradicate the 24th mechanical motor order, the order (for example, 6) which is divided by the number of pole pairs is used in the electric system. Subsequently, the angle θ and the phase position are added to form a sum angle. In the example, a sine of the sum angle is subsequently formed and is implemented by way of a trigonometric function. On account of the rotating rotor, this therefore results in a sinusoidal alternating variable with an amplitude of, for example, 1 V. The alternating variable then is multiplied by the desired amplitude both for the d-actuating voltage $U_{ANR}$, d and for the q-actuating voltage $U_{ANR}$, q. The amplitude for this results from the specified amplitude $U_{ANR}$ and the pilot control angle $\gamma_{ANR}$.

Figure 4:
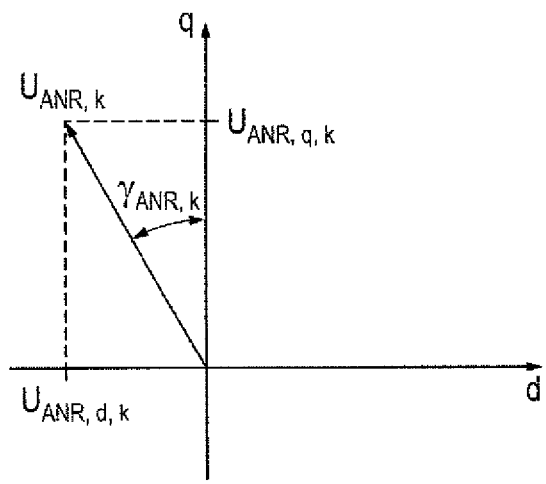
FIG. 4 is a diagram for the calculation.

The amplitude $U_{ANR,k}$, the phase $\varphi_{ANR}$, k and the pilot control angle $\gamma_{ANR,k}$ of the k-th harmonic is stored in the characteristic diagrams in a manner dependent on the rotational speed, the torque and the temperature. As an alternative, the characteristic diagrams can be stored in a manner dependent on the d-q currents $i_{dq}$, the temperature and the rotational speed to take into consideration both the saturation of the electric traction motor 100 and a frequency of a resulting actuating voltage $u_{abc}$. The optimum actuating voltage or current harmonic is dependent on a fundamental oscillation amplitude of the current, the stator spline, the residual flux density of the magnets and the saturation of the electric traction motor 100. The definition of the amplitude $U_{ANR,k}$ and the pilot control angle $\gamma_{ANR,k}$ can be gathered from a pointer diagram in a rotor-fixed coordinate system for the k-th order. This is shown diagrammatically in FIG. 4. The temporal phase shift $\varphi_{ANR,k}$ cannot be shown in the pointer diagram.

There can be plural subsystems of identical construction for generating the harmonics 336 of various orders. As a result, a "multi-order noise reduction" can be realized. The order number can be specified freely. A system for generating a harmonic #1, for example of the 6th electric order, can be provided. A system for generating a harmonic #2, for example of the 12th electric order, can be provided. A system for generating a harmonic #3, for example of the 18th electric order, can be provided. These harmonics are superimposed both for the d-actuating voltage $U_{ANR}$, d and for the q-actuating voltage $U_{ANR}$, q by way of an addition. The setting of the amplitude, the phase and the pilot control angle of the harmonics 336 takes place in a manner dependent on the rotational speed, the torque, the temperature and/or the d-q currents. Moreover, the number of pole pairs is taken into consideration for the setting of the correct electric order. Furthermore, the individual orders can be activated and deactivated, that is to say can be used or not used for the superimposition.

The current controller 302 is configured to actuate the output stage 304 in a manner dependent on the sum of the d-actuating voltage $U_{ANR}$, d and a q-actuating voltage $U_{ANR}$, q by way of an actuating variable $u_{dq}$ of the current controller 302. The sum is used for the determination of the resulting actuating variable 106. The actuating variable $u_{dq}$ is determined in a manner which is dependent on a control deviation by way of a PI controller (denoted by PI in FIG. 3). The control deviation is formed in the example in a manner which is dependent on the d-q currents $i_{dq}$ and a reference value for the d-q currents $i_{dq,ref}$. In the example, the control deviation is the difference thereof.

The current controller 302 can be configured for cascaded current control. After the cascaded current control, the harmonic voltages, that is to say the d-actuating voltage $U_{ANR}$, d and the q-actuating voltage $U_{ANR}$, q, can be added to the actuating variable $u_{dq}$ of the current controller 302 for influencing the NVH for the electric traction motor 100. In the example, the actuating voltage $u_{abc}$ is determined from the sum voltage which results therefrom in each case by way of a transformation $T^{-1}(\theta)$ and a subsequent transformation $T_{\alpha\beta}^{-1}$. They are denoted in this way in FIG. 3. By way of said actuating voltage $u_{abc}$, the output stage 304 is actuated. In the example, the actuating voltage $u_{abc}$ leads to the resulting actuating variable 106 which is output by the output stage 304.

The filtered currents, that is to say the d-q currents $i_{dq}$, can be activated or deactivated. When the use of the filtered currents is deactivated, the unfiltered currents are transferred to the cascaded current controller.

The specification device 318 and the coefficient specification device 308 can be software modules that are calculated in a first task in the controller 104. In the example, the first task is a 1 ms task.

The current controller 302 and the influencing device 334 can be software modules determined in a second task in the controller 104. The second task may be calculated with a PWM frequency. The first task can be slower than the second task.

In the example, the band stop filter is calculated in the PWM task. In the example, the filter coefficients are provided from a function that is executed in the slower task, for example 1 ms.

For example, the characteristic diagrams both of the amplitude, the phase and the pilot control angle, and also the coefficients of the band stop filter are stored in the slow task. In the most rapid task, for example with a PWM frequency, the band stop filter 306 is used, and the harmonic voltages 336 are generated. This division can be advantageous if PWR software is accounted for by way of a supplier, and an OEM nevertheless wishes to have extensive options for software development and application, without it being necessary to intervene in the current controller. The slow task can then be modified, for example, by way of a bypass. Even if use is not made of this, a division into different tasks can be advantageous, in order to reduce the load of the control unit.

Figure 5:
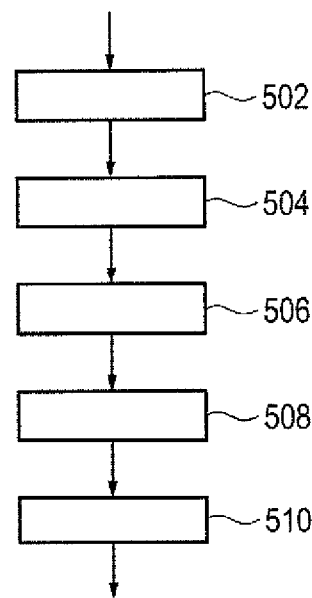
FIG. 5 shows steps in a method for influencing electromagnetic forces of an electric traction motor.

A method for influencing electromagnetic forces of an electric traction motor will be described in the following text on the basis of FIG. 5.

In a step 502, the angle θ of the rotor of the electric traction motor 100 and the input current for the filter 306 are determined.

Step 504 subsequently is carried out. In step 504, for example, the amplitude, the phase and/or the pilot control angle for the harmonic 336 are/is determined. This can take place in the first task.

In step 504, for example, the parameters 322 for the harmonic 336 are generated as a harmonic 336 of a higher order in a manner dependent on the rotational speed of the electric traction motor 100, the torque of the electric traction motor 100 and the temperature at the electric traction motor 100. In the example, the harmonic 336 is generated at a frequency that is an integral multiple of the frequency of the fundamental oscillation of the actuating variable $u_{abc}$. The parameters 322 for the harmonic 336 can be determined in a manner dependent on the characteristic diagram that assigns the amplitude, the phase and/or the pilot control angle for the determination of the harmonic 336 to the rotational speed, the torque and the temperature. The parameters 322 for the harmonic 336 can be determined in a manner dependent on the characteristic diagram that assigns the amplitude, the phase and/or the pilot control angle for the determination of the harmonic 336 to the three-phase current or the three-phase voltage, the temperature and the rotational speed. The magnitude of the order of the harmonic 336 can be determined in a manner which is dependent on the number of pole pairs of the traction motor 100. The amplitude, the phase and/or the pilot control angle for the harmonic 336 can be limited by way of the limiter 330.

In step 506, the harmonic 336 is determined. In the example, the harmonic 336 is determined in a manner dependent on the parameters 322. The generation of the harmonics 336 can take place in the second task.

In step 508, the actuating variable $u_{dq}$ for the electric traction motor 100 is superimposed with the harmonic 336 of a higher order for the generation of the resulting actuating variable $u_{abc}$.

Subsequently, step 510 is carried out.

In step 510, the electric traction motor 100 is actuated in a manner which is dependent on the resulting actuating variable $u_{abc}$.

The actuating variable $u_{dq}$, the harmonic 336 and the resulting actuating variable $u_{abc}$ characterize in each case actuating voltages in this example.

The resulting actuating variable $u_{abc}$ preferably is determined in a manner dependent on the input current that is filtered by the filter 306.

What is claimed is:

1. A method for influencing electromagnetic forces of an electric traction motor, comprising:
   superimposing a higher-order harmonic on an actuating variable for the electric traction motor in a manner that is dependent on a rotational speed of the electric traction motor, a torque of the electric traction motor, a temperature at the electric traction motor, or a three-phase current or a three-phase voltage of the electric traction motor for generating a resulting actuating variable,
   actuating the electric traction motor in a manner dependent on the resulting actuating variable, and
   the actuating variable, the harmonic and the resulting actuating variable characterizing an actuating current or an actuating voltage,
   wherein the harmonic has an amplitude, a phase and a pilot control angle defined by relative d-axis and q-axis amplitudes of the three-phase current or the three-phase voltage, a rate of change for each of the amplitude, the phase, and the pilot control angle for the harmonic being limited by way of a limiter to stabilize the influencing electromagnetic forces of an electric traction motor.

2. The method of claim 1, wherein the harmonic has a frequency that is an integral multiple of a frequency of the fundamental oscillation of the actuating variable of the actuating current or the actuating voltage.

3. The method of claim 1, wherein the harmonic is determined in a manner that is dependent on at least one characteristic diagram that assigns the amplitude, the phase and/or the pilot control angle to the rotational speed, the torque and/or the temperature for a determination of the harmonic.

4. The method of claim 1, wherein the harmonic is determined in a manner that is dependent on a characteristic diagram that assigns the amplitude, the phase and/or the pilot control angle to the three-phase current or the three-phase voltage, the temperature and/or the rotational speed for a determination of the harmonic.

5. The method of claim 1, wherein the determination of the amplitude, the phase, and/or the pilot control angle for the harmonic takes place in a first task, the generation of the harmonic taking place in a second task.

6. The method of claim 5, wherein the first task is executed in a first time period and the second task is executed in a second time period, the first time period being greater than the second time period.

7. The method of claim 1, wherein a magnitude of the order of the harmonic is determined in a manner dependent on a number of pole pairs of the traction motor.

8. The method of claim 1, wherein the resulting actuating variable is determined in a manner which is dependent on the torque and the rotational speed.

9. The method of claim 1, wherein the actuating variable is determined in a manner dependent on at least one input current that is filtered by way of a filter that can be deactivated, when the filter is activated, coefficients of the filter are determined based on the rotational speed of the electric traction motor to suppress a frequency of the at least one current in a variable manner such that the harmonic is not perceived as a disturbance variable.

10. The method as claimed of claim 1, wherein plural harmonics of differing order are generated and are superimposed for the generation of the resulting actuating variable.

11. An apparatus for influencing electromagnetic forces of an electric traction motor, comprising a controller configured to actuate the electric traction motor in accordance with the method of claim 1.

12. The method of claim 1, wherein the harmonic is determined in a manner that is dependent on three characteristic three-dimensional diagrams, each three-dimensional diagram assigns at least one of the amplitude, the phase and the pilot control angle to the rotational speed, the torque and the temperature of the electric traction motor for a determination of the harmonic.

* * * * *